(12) United States Patent
Krishnakumar et al.

(10) Patent No.: US 11,112,880 B1
(45) Date of Patent: Sep. 7, 2021

(54) SELECTIVELY CONTROLLING A MONITOR'S ON-SCREEN DISPLAY WITH A KEYBOARD OR MOUSE

(71) Applicant: Dell Products L.P., Round Rock, TX (US)

(72) Inventors: Karthikeyan Krishnakumar, Austin, TX (US); Manish Krishnaji Desai, Singapore (SG)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/087,023

(22) Filed: Nov. 2, 2020

(51) Int. Cl.
*G06F 3/033* (2013.01)
*G06F 3/023* (2006.01)
*G06F 3/14* (2006.01)
*G06F 3/0354* (2013.01)

(52) U.S. Cl.
CPC .......... *G06F 3/023* (2013.01); *G06F 3/03543* (2013.01); *G06F 3/14* (2013.01)

(58) Field of Classification Search
CPC .... G06F 3/03547; G06F 1/1607; G06F 3/023; G06F 3/14; G06F 3/03543; G06F 3/04817; G06F 3/038; G06F 3/0482; G06F 2203/0384
See application file for complete search history.

(56) References Cited

U.S. PATENT DOCUMENTS

| | | | | |
|---|---|---|---|---|
| 8,196,059 B2* | 6/2012 | Chen | ......................... | G06F 3/02 715/778 |
| 8,671,235 B2* | 3/2014 | Tung | ..................... | G06F 3/0489 710/62 |
| 9,355,455 B2* | 5/2016 | An | ........................ | H04N 13/128 |
| 9,661,230 B2* | 5/2017 | Kwon | .................... | H04N 5/332 |
| 2008/0250350 A1* | 10/2008 | Chen | ....................... | G06F 3/023 715/810 |
| 2010/0060571 A1* | 3/2010 | Chen | ..................... | G06F 3/0227 345/157 |
| 2014/0035902 A1* | 2/2014 | An | ....................... | H04N 13/128 345/419 |

* cited by examiner

*Primary Examiner* — Vijay Shankar
(74) *Attorney, Agent, or Firm* — Kirton McConkie; Brian Tucker

(57) ABSTRACT

A monitor's OSD can be selectively controlled with a keyboard, mouse or other human interface device. A microcontroller of a keyboard, mouse or other human interface device can be configured to detect the occurrence of input representing an OSD command. In response, the microcontroller can commence sending input to the monitor rather than to the computing device so that the input can control the OSD. Similarly, a filter driver on the monitor can be configured to detect the occurrence of input representing the OSD command. In response, the filter driver can commence sending input to the monitor's scalar rather than to the computing device.

20 Claims, 9 Drawing Sheets

SELECTIVELY CONTROLLING A MONITOR'S ON-SCREEN DISPLAY WITH A KEYBOARD OR MOUSE

CROSS-REFERENCE TO RELATED APPLICATIONS

N/A

BACKGROUND

In the context of a computer monitor, an on-screen display (OSD) is a visible interface that the monitor displays to allow the user to view and modify settings of the monitor. As represented in FIG. 1, a monitor 100 typically includes physical buttons 110 on its bezel 100a that, when pressed, cause monitor 100's scalar to overlay an OSD 120 on whatever content is currently being displayed on screen 100b.

With advances in technology that allow for narrower/thinner bezels, it is becoming difficult to position physical buttons on the monitor in a location that is reasonably accessible to the user. For example, with the latest monitors, it may only be possible to position physical buttons on the rear of the monitor—a location that users cannot easily see and access while viewing the OSD.

To address this problem, monitors could be designed to provide a touch-based OSD. In other words, the physical buttons can be replaced with soft buttons that form part of the screen. Yet, this approach is undesirable because it requires the screen to be a touch screen—at least in the region where the soft buttons are implemented. Touch screens, and particularly large touch screens, are much more expensive than standard screens.

BRIEF SUMMARY

The present invention extends to methods, systems and computer program products for selectively controlling a monitor's OSD with a keyboard or mouse as well as to monitors that are configured to enable a user to selectively employ a keyboard or mouse to control the monitor's OSD. A microcontroller of a keyboard, mouse or other human interface device can be configured to detect the occurrence of input representing an OSD command. In response, the microcontroller can commence sending input to the monitor rather than to the computing device so that the input can control the OSD. Similarly, a filter driver on the monitor can be configured to detect the occurrence of input representing the OSD command. In response, the filter driver can commence sending input to the monitor's scalar rather than to the computing device. The filter driver may also be employed to detect secure commands and route them to an embedded controller so that they can be securely implemented between the monitor and the computing device.

In some embodiments, the present invention may be implemented as a method for selectively controlling a monitor's OSD with a human interface device. Prior to detecting an OSD command, input from the human interface device can be provided to a computing device to which the monitor is connected. The OSD command may then be detected. In response to detecting the OSD command, input from the human interface device can be provided to the monitor to thereby cause the input to control the monitor's OSD.

In some embodiments, the present invention may be implemented as a system that includes a computing device, a monitor and a human interface device. The system may be configured to perform a method for selectively controlling a monitor's OSD with a human interface device. Prior to detecting an OSD command, the system can be configured to provide input from the human interface device to the computing device. The system may then detect the OSD command. In response to detecting the OSD command, the system may be configured to provide input from the human interface device to the monitor to thereby cause the input to control the monitor's OSD.

In some embodiments, the present invention may be implemented as a method for selectively controlling a monitor's OSD with a human interface device. Input from the human interface device can be evaluated to detect occurrences of an OSD command. In response to an occurrence of the OSD command, an OSD mode can be toggled. For input that is not the OSD command, the input can be sent to the computing device when the OSD mode is off and to the monitor when the OSD mode is on.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

Embodiments of the present invention extend to various system configurations and techniques for enabling a user to selectively control a monitor's OSD with a keyboard or mouse. FIGS. 2-9 provide block diagrams and corresponding flow diagrams for four of these system configurations and techniques. However, these block diagrams and flow diagrams should not be viewed as the only possibly variations and should not be considered mutually exclusive. For example, the same system could be configured to enable any of the different techniques to be performed.

In the specification and the claims, the term "computing device" should be construed as any end user computing device that is capable of connecting to a monitor for the purpose of outputting a display and that is capable of receiving user input from a keyboard and/or mouse. A computing device may therefore oftentimes be a desktop or laptop computer. In the claims, the term "human interface device" will be used to encompass both a keyboard and a mouse. In the description, embodiments of the present invention will primarily be described in the context of a system where the user uses a keyboard to selectively control the monitor's OSD. However, it should be understood that the described embodiments can also be implemented in a system where the user uses a mouse alone or both a keyboard and a mouse to selectively control the monitor's OSD. Furthermore, embodiments of the present invention could also be implemented in a system where the user uses a different type of human interface device to selectively control the monitor's OSD.

Figure 1:
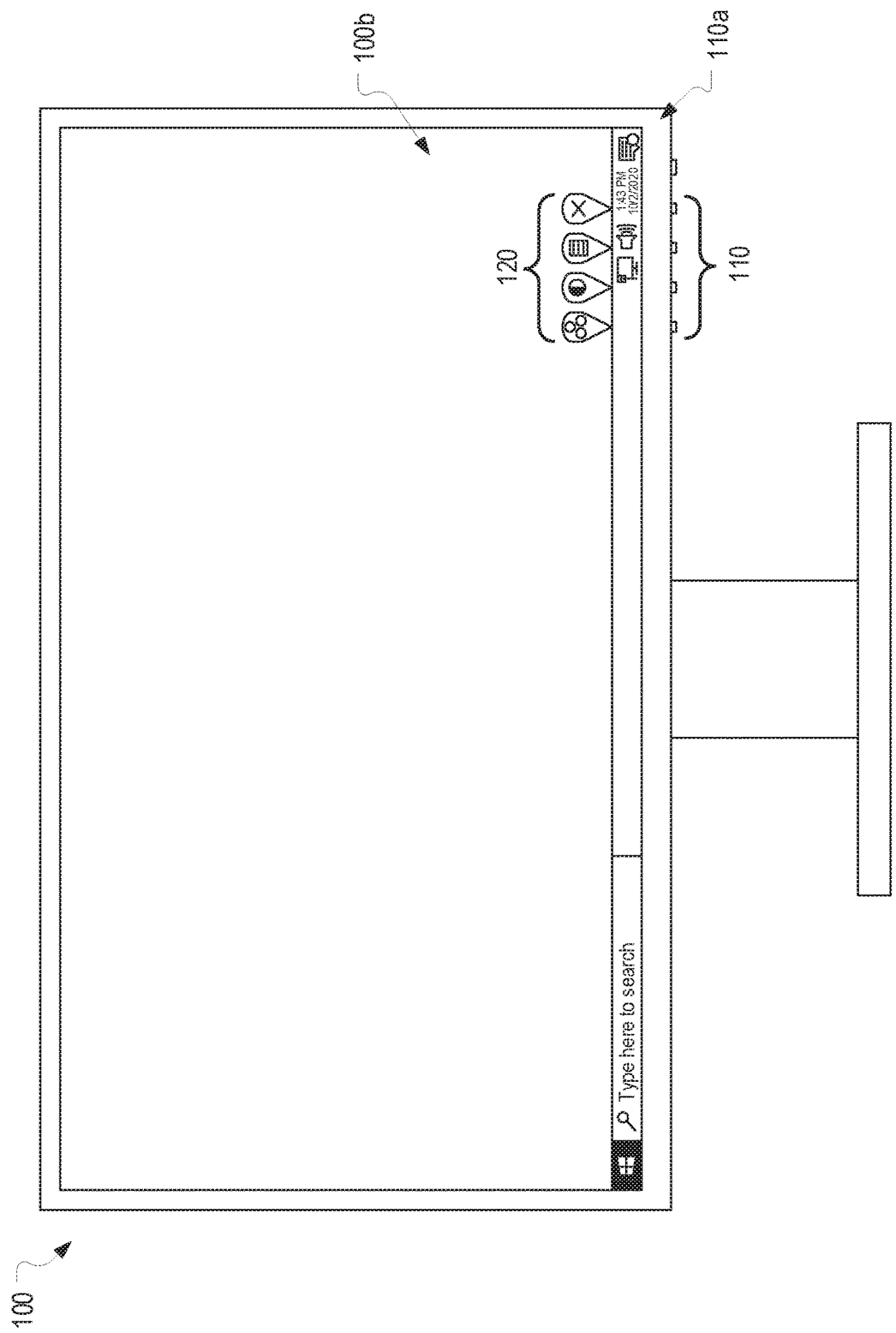
FIG. 1 illustrates a prior art monitor that includes physical buttons for controlling an OSD.
Figure 2:
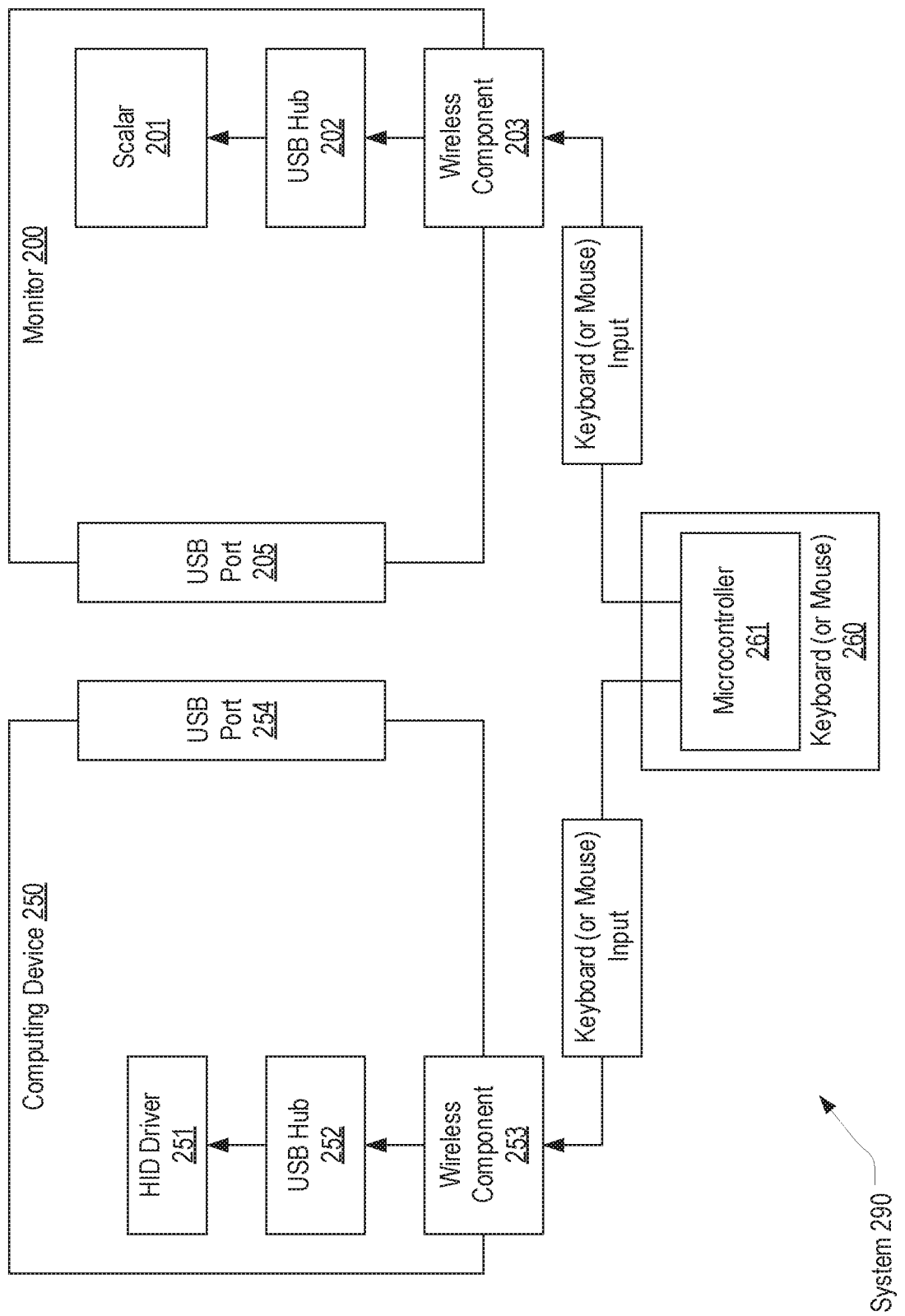
FIG. 2 is a block diagram of a system that is configured to enable a user to selectively control a monitor's OSD with a keyboard or mouse.

Turning to FIG. 2, a system 290 is shown which includes a monitor 200, a computing device 250 and a keyboard 260. Computing device 250 is shown as including a human interface device (HID) driver 251, a USB hub 252, a wireless component 253 and a USB port 254. Wireless component 253 can represent any suitable component that enables keyboard 260 to wirelessly communicate keyboard input to computing device 250 (e.g., via Bluetooth, Wi-Fi, etc.). FIG. 2 shows the keyboard input as being passed to USB hub 252 and then to HID driver 251. However, depending on wireless component 253, the keyboard input could be provided directly to HID driver 251. Accordingly, the exact architecture employed on computing device 250 to receive keyboard input is not essential to the present invention. Also, as noted above, keyboard 260 could be replaced with a mouse in system 290 in which case mouse input would be provided to HID driver 251 via wireless component 253. Although not shown, computing device 250 connects to monitor 200 to output a display. In some embodiments, this connection could be via a USB C cable connected between USB port 254 and USB port 205. However, the manner in which computing device 250 outputs a display to monitor 200 is not essential to embodiments of the present invention and is therefore not shown in the figures.

In FIG. 2, monitor 200 is shown as having a scalar 201, a USB hub 202, a wireless component 203 and a USB port 205. Scalar (or scaler) 201 can represent the circuitry of monitor 200 that generates the visual display from the display signal received from computing device 250 and that generates and displays the OSD including managing any settings of monitor 200 that are made accessible to the user via the OSD. Wireless component 203, like wireless component 253, can represent any suitable circuitry by which keyboard 260 (or a mouse or other HID) communicates with monitor 200.

FIG. 2 also shows that keyboard 260 includes a microcontroller 261 which can represent the circuitry that detects keypresses (or other physical interaction with the keyboard) and relays "keyboard input" indicative of such keypresses. In accordance with embodiments of the present invention, microcontroller 261 can also be configured to selectively route keyboard input to either computing device 250 or monitor 200. As represented in FIG. 2, when microcontroller 261 routes keyboard input to computing device 250, the keyboard input will be provided to HID driver 251, whereas, when microcontroller 261 routes keyboard input to monitor 200, the keyboard input will be provided to scalar 201.

Prior to describing the underlying functionality that microcontroller 261 performs to selectively route keyboard input to either monitor 200 or computing device 250, it will be helpful to consider what the user will see when this functionality is performed. It can be assumed that the OSD is not initially presented on monitor 200. In this state, the user may type on keyboard 260 in a standard manner to provide input to computing device 250. It can then be assumed that, while typing, the user determines that the settings of monitor 200 are not ideal (e.g., that the brightness, contrast or color of the display is not ideal). In accordance with embodiments of the present invention, the user can press the appropriate key or keys on keyboard 260 (as opposed to pressing a physical button on monitor 200) to cause monitor 200's OSD to appear. Then, while the OSD is visible, the user can use keyboard 260 to provide input for controlling the OSD (e.g., by using keyboard 260's arrows keys and enter key to navigate the menu of the OSD). Notably, this input will be delivered to scalar 201 rather than HID driver 251 as described below. When the user has finished providing input to the OSD, he or she can again press the appropriate key or keys to cause monitor 200's OSD to disappear. Alternatively, in some embodiments, the OSD could automatically disappear if the user does not provide any keyboard input for a duration of time. At this point, when the user resumes typing, the input will again be delivered to computing device 250.

Figure 3:
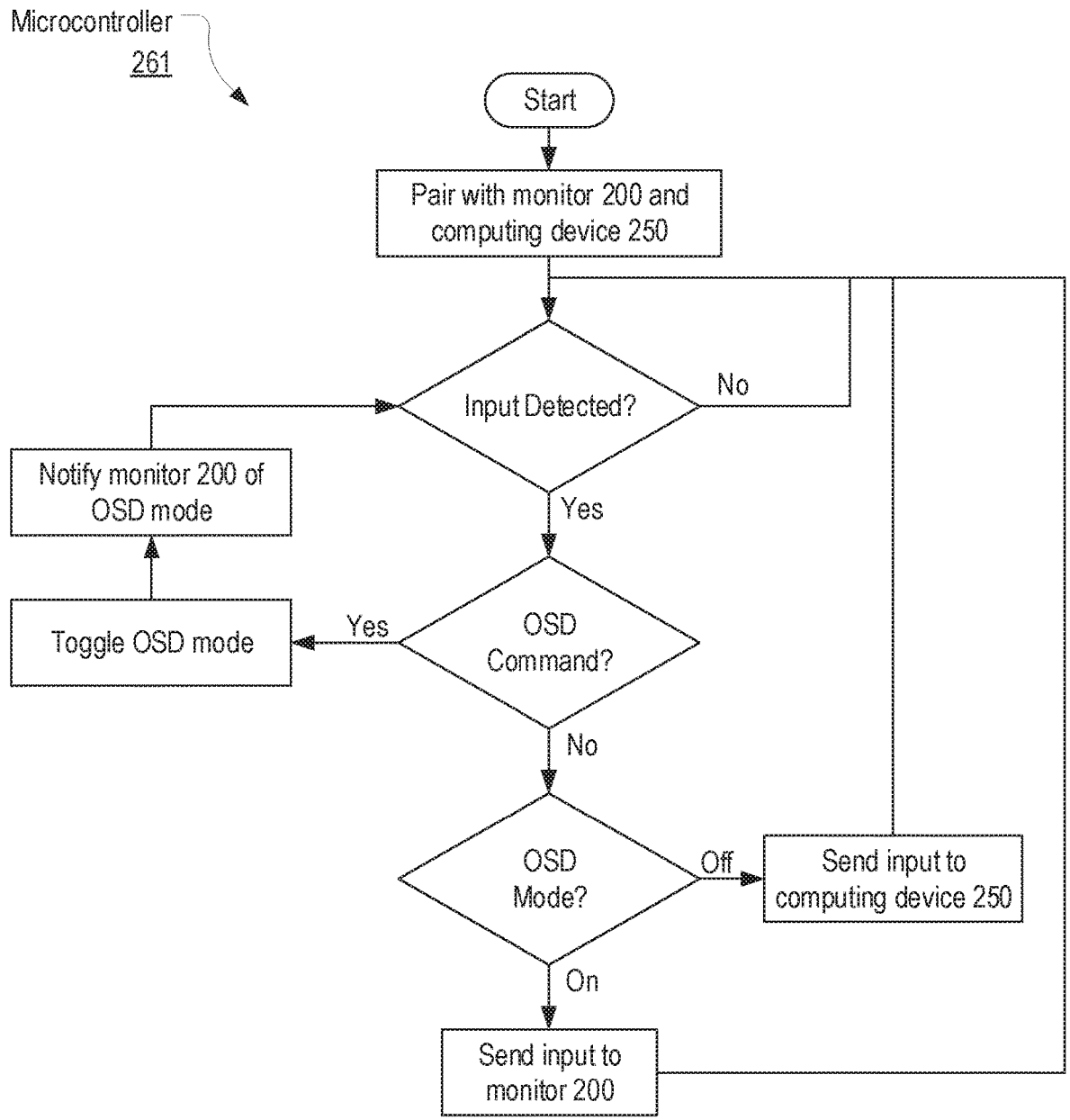
FIG. 3 is a flow diagram of a method that can be implemented in the system shown in FIG. 2 to selectively control a monitor's OSD with a keyboard or mouse.

FIG. 3 provides a flow diagram representing the functionality that microcontroller 261 can perform to enable a user to selectively control monitor 200's OSD with keyboard 260. As noted above, a microcontroller of a mouse or other HID could equally be configured to perform this functionality in some embodiments of the present invention. As an initial step, microcontroller 261 can pair with monitor 200 and computing device 250. In other words, when embodiments of the present invention are implemented in system 290, keyboard 260 can be simultaneously paired with monitor 200 and computing device 250.

While paired with monitor 200 and computing device 250, microcontroller 261 can continuously detect when the user presses a key or keys. In response to detecting input, microcontroller 261 can determine whether the input is an "OSD command." For purposes of the description and the claims, the term "OSD command" will be used to represent a particular key or key combination (or in the case of a mouse, a particular button or button combination) that is recognized as a request to open or close the OSD. For example, keyboard 260 may have a dedicated "OSD command key" for opening and closing the OSD or a combination of traditional keys may be dedicated for opening and closing the OSD. In some embodiments, the same key or key combination need not be employed to both open and close the OSD.

When microcontroller 261 determines that the detected input is the OSD command, it can toggle an internal "OSD mode" that it maintains to track whether input should be routed to monitor 200 or computing device 250. For this description, it is assumed that, when the OSD mode is "on," microcontroller 261 will route input to monitor 200, whereas, when OSD mode is "off," microcontroller 261 will route input to computing device 250. In conjunction with toggling the OSD mode, microcontroller 261 can also notify monitor 200 to either show the OSD (when the OSD mode is toggled on) or hide the OSD (when the OSD mode is toggled off). In some embodiments, microcontroller 261 could provide this notification by routing the OSD command to scalar 201. Alternatively, in some embodiments, microcontroller 261 could send any other suitable type of notification.

When microcontroller 261 determines that the detected input is not the OSD command, it can then determine whether the OSD mode is on or off. When the OSD mode is on, microcontroller 261 can route the input to monitor 200, whereas, when the OSD mode is off, microcontroller 261 can route the input to computing device 250. Although not shown, when microcontroller 261 routes the input to monitor 200, scalar 201 will receive the input and respond to it by updating the OSD and, if appropriate, changing any applicable settings. For example, when scalar 201 receives input representing the press of the down arrow key while the OSD menu is displayed, it can update the OSD menu to highlight a next lowest entry in the menu. Similarly, if scalar 201 receives input representing the press of the enter key while a particular setting is highlighted in the OSD menu, scalar 201 may apply the particular setting.

To summarize, in the embodiments represented in FIGS. 2 and 3, microcontroller 261 can transition to routing input to monitor 200 in response to the user pressing the OSD command key a first time and can transition back to routing input to computing device 250 in response to the user pressing the OSD command key a second time. In this way, microcontroller 261 enables the user to selectively control monitor 200's OSD with the same keyboard that the user uses to provide input to computing device 250.

Figure 4:
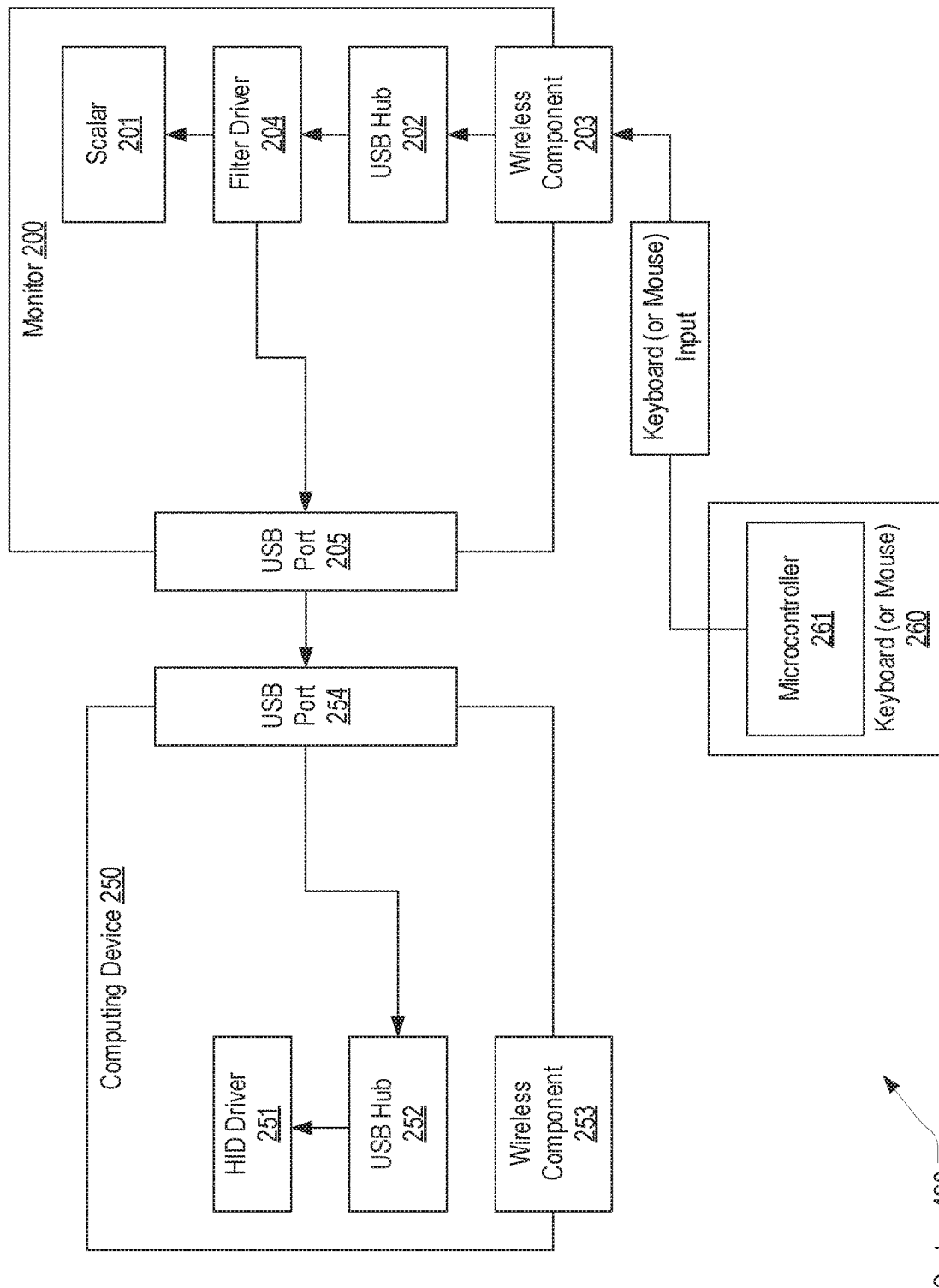
FIG. 4 is a block diagram of another system that is configured to enable a user to selectively control a monitor's OSD with a keyboard or mouse.
Figure 5:
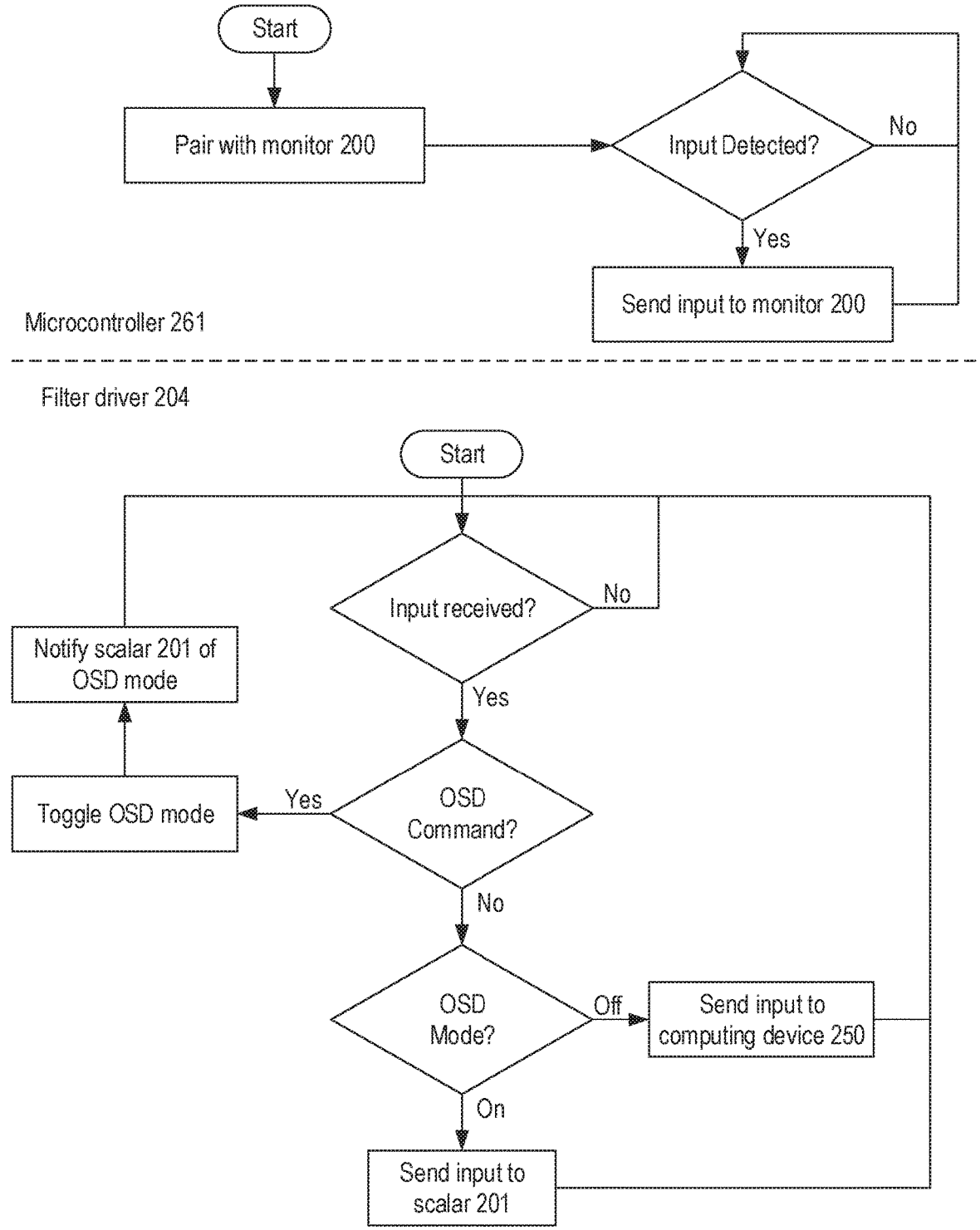
FIG. 5 is a flow diagram of a method that can be implemented in the system shown in FIG. 4 to selectively control a monitor's OSD with a keyboard or mouse.

Turning to FIG. 4, another system 490 is shown which includes monitor 200, computing device 250 and keyboard (or mouse) 260. In comparison to system 290 of FIG. 2, in system 490, a filter driver 204 is layered on top of USB hub 202 on monitor 200. FIG. 5 provides a flow diagram of the functionality that can be performed in system 490 to enable a user to selectively control monitor 200's OSD with keyboard 260.

As shown in FIG. 5, in system 490, microcontroller 261 can be configured to pair with and send all input to monitor 200. As a result, whenever the user presses a key on keyboard 260, the resulting input will be passed up to filter driver 204. Filter driver 204 can be configured to detect when input is received. When filter driver 204 receives input, it can perform similar functionality as microcontroller 261 in system 290. In particular, filter driver 204 can determine whether the input is an OSD command and if so, toggle the OSD mode and notify scalar 201 appropriately. When the input is not an OSD command, filter driver 204 can determine whether OSD mode is on or off. When OSD mode is off, filter driver 204 can route the input to computing device 250, whereas, when OSD mode is on, filter driver 204 can route the input to scalar 201. As represented in FIG. 4, filter driver 204 can route input to computing device 250 by sending the input to USB hub 252 via USB port 205 and USB port 254 which may be USB C ports. USB hub 252 can then pass the input to HID driver 251.

To summarize, in the embodiments represented in FIGS. 4 and 5, filter driver 204 can transition to routing input to scalar 201 in response to the user pressing the OSD command key a first time and can transition back to routing input to computing device 250 in response to the user pressing the OSD command key a second time. In this way, filter driver 204 enables the user to selectively control monitor 200's OSD with the same keyboard that the user uses to provide input to computing device 250.

Figure 6:
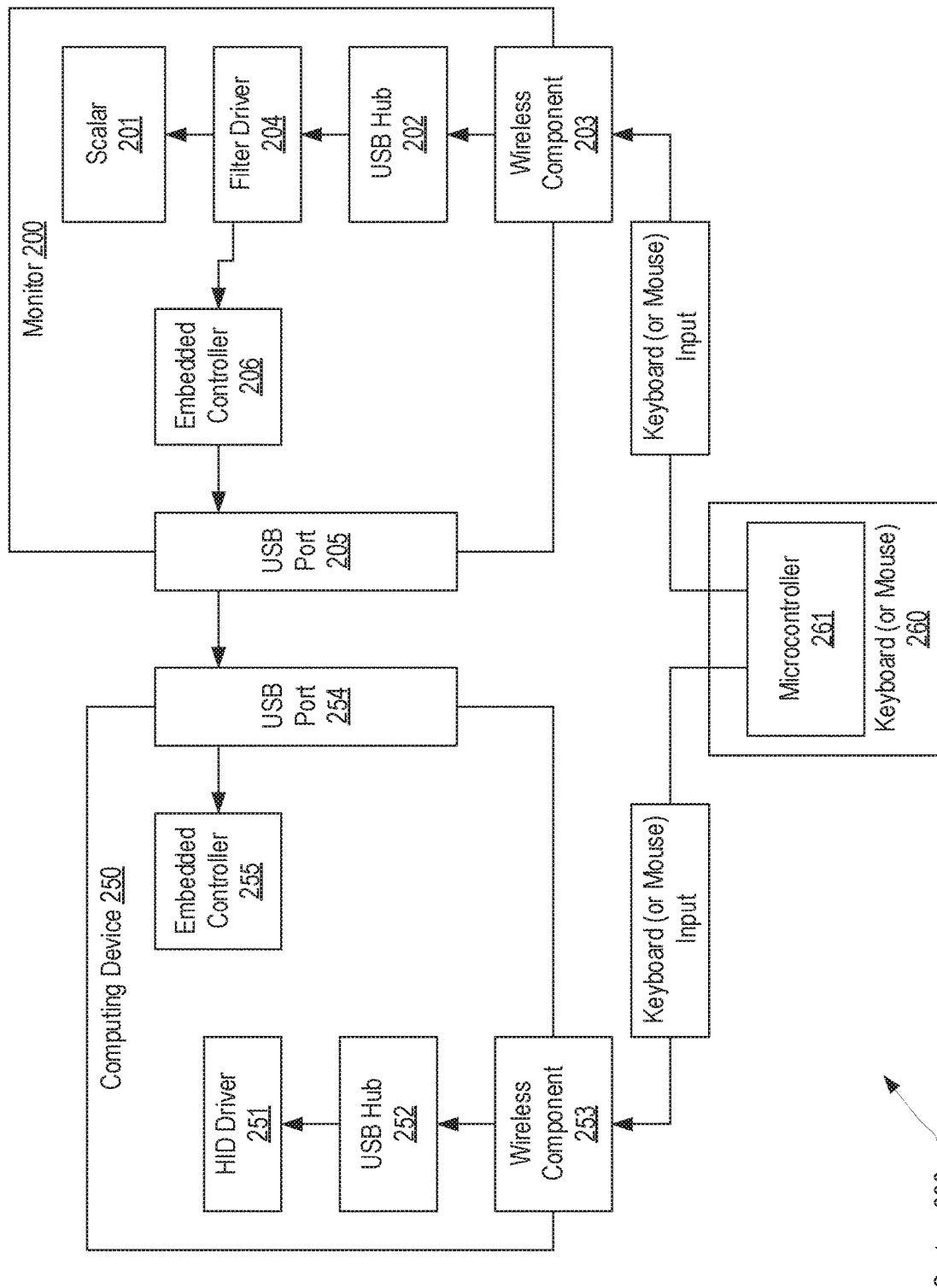
FIG. 6 is a block diagram of another system that is configured to enable a user to selectively control a monitor's OSD with a keyboard or mouse.

Turning to FIG. 6, another system 690 is shown which includes monitor 200, computing device 250 and keyboard (or mouse) 260. System 690 is the same as system 290 with the addition of filter driver 204 that is loaded above USB hub 202 on monitor 200, an embedded controller 206 on monitor 200 and an embedded controller 255 on computing device 250. Notably, embedded controllers 206 and 255 could be present in system 290 but may not be employed in the functionality represented in FIG. 3.

Figure 7:
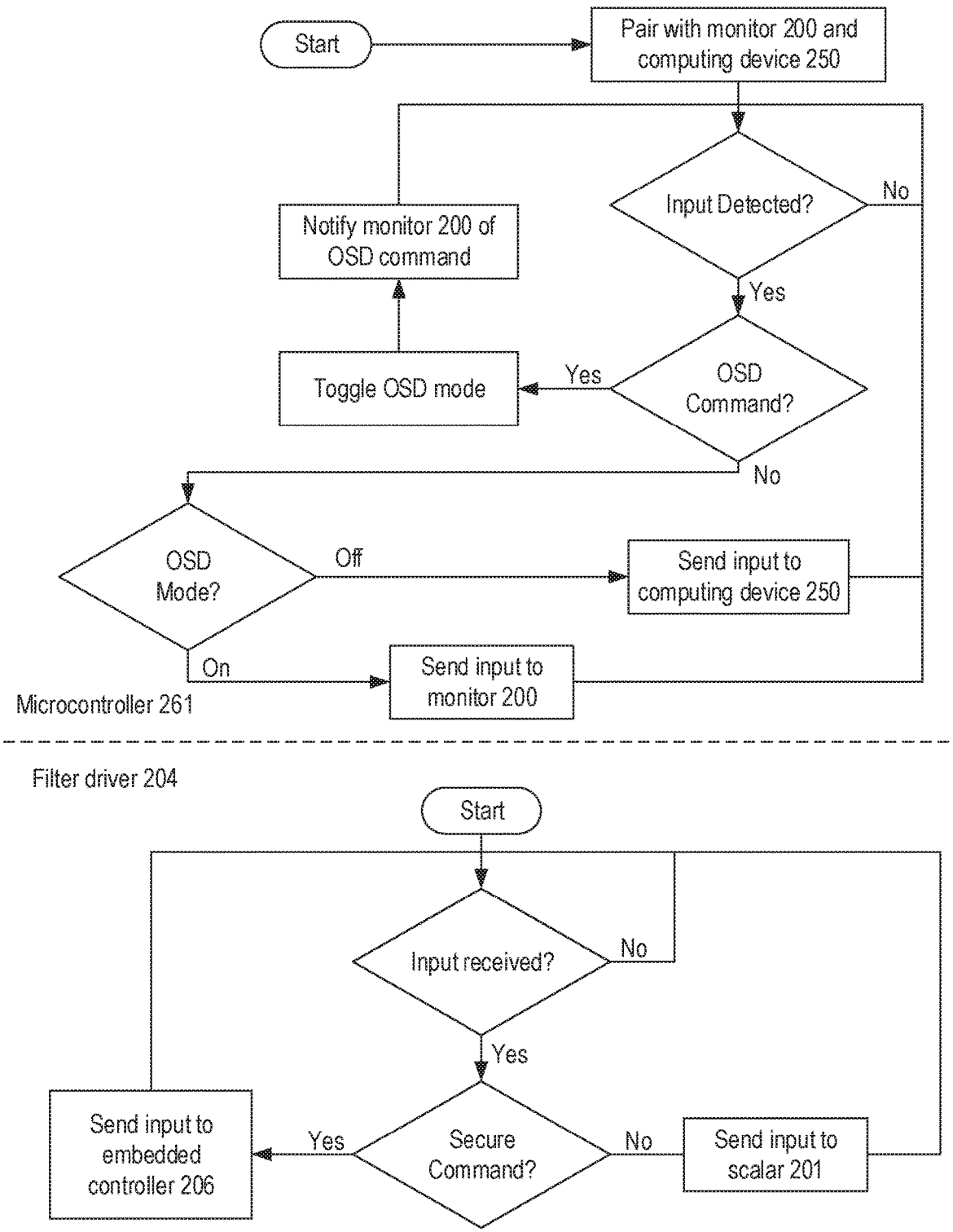
FIG. 7 is a flow diagram of a method that can be implemented in the system shown in FIG. 6 to selectively control a monitor's OSD with a keyboard or mouse.

As represented in the top portion of FIG. 7, in system 690, microcontroller 261 can perform the same functionality as microcontroller 261 performs in system 290. However, when microcontroller 261 routes input to monitor 200, filter driver 204 can perform an additional determination of whether the input is a secure command. If not, filter driver 204 can route the input to scalar 201. However, if filter driver 204 determines that the input is a secure command, it can send the input to embedded controller 206. Embedded controller 206 can then communicate appropriately with embedded controller 255 to carry out the secure command. In some embodiments, this communication can comply with the I2C protocol and can be sent via the CC wire of a USB C cable connected between USB ports 205 and 254. Specific examples of secure commands that may be routed in this manner include commands for implementing USB power delivery (PD) techniques which could be invoked by pressing the F9 key, the F4 key, the combination of the function (Fn) key and the P key, etc.

Figure 8:
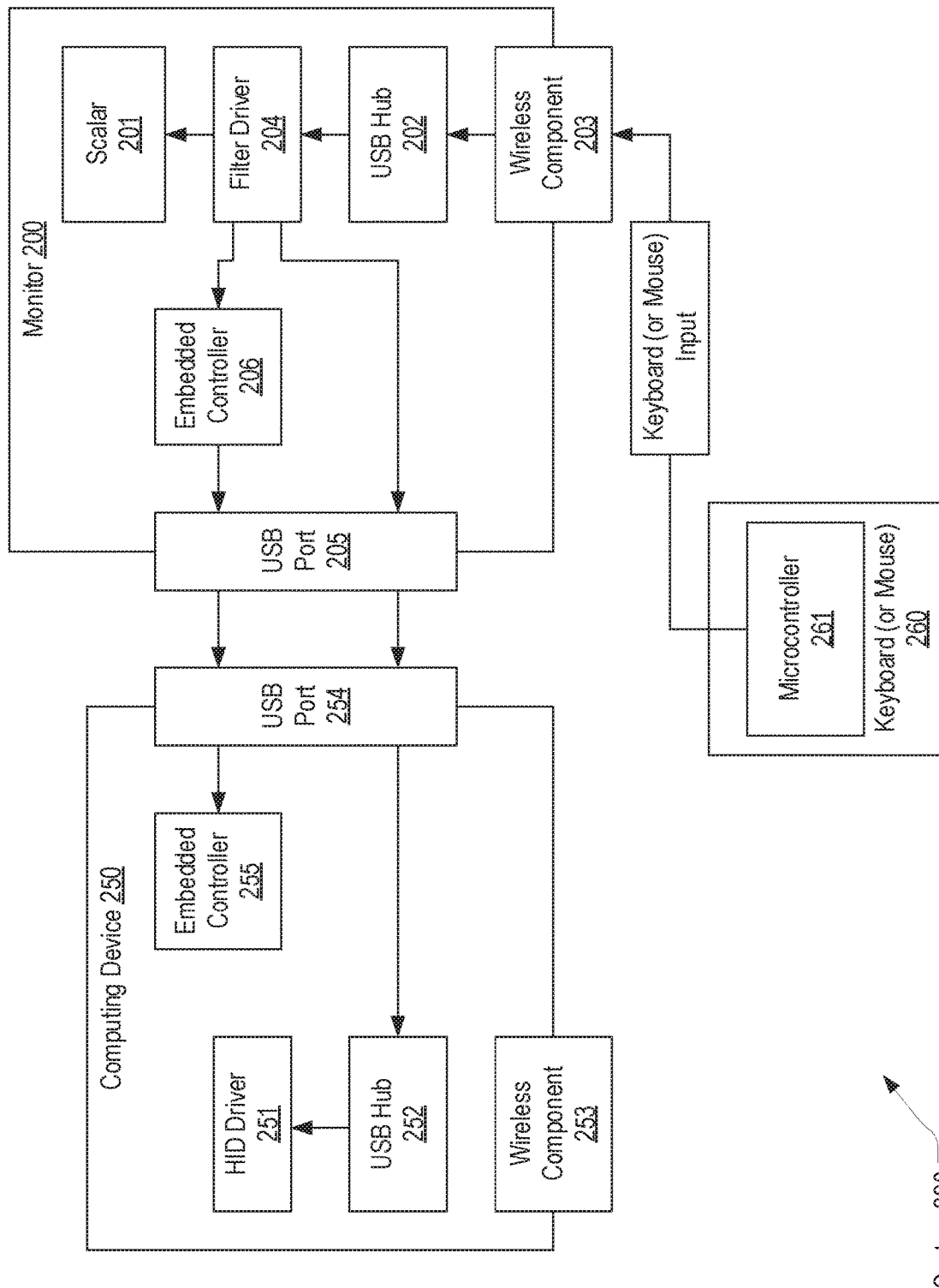
FIG. 8 is a block diagram of another system that is configured to enable a user to selectively control a monitor's OSD with a keyboard or mouse.

Turning to FIG. 8, another system 890 is shown which includes monitor 200, computing device 250 and keyboard (or mouse) 260. System 890 is the same as system 490 with the addition of embedded controller 206 on monitor 200 and embedded controller 255 on computing device 250. Notably, embedded controllers 206 and 255 could be present in system 490 but may not be employed in the functionality represented in FIG. 5.

Figure 9:
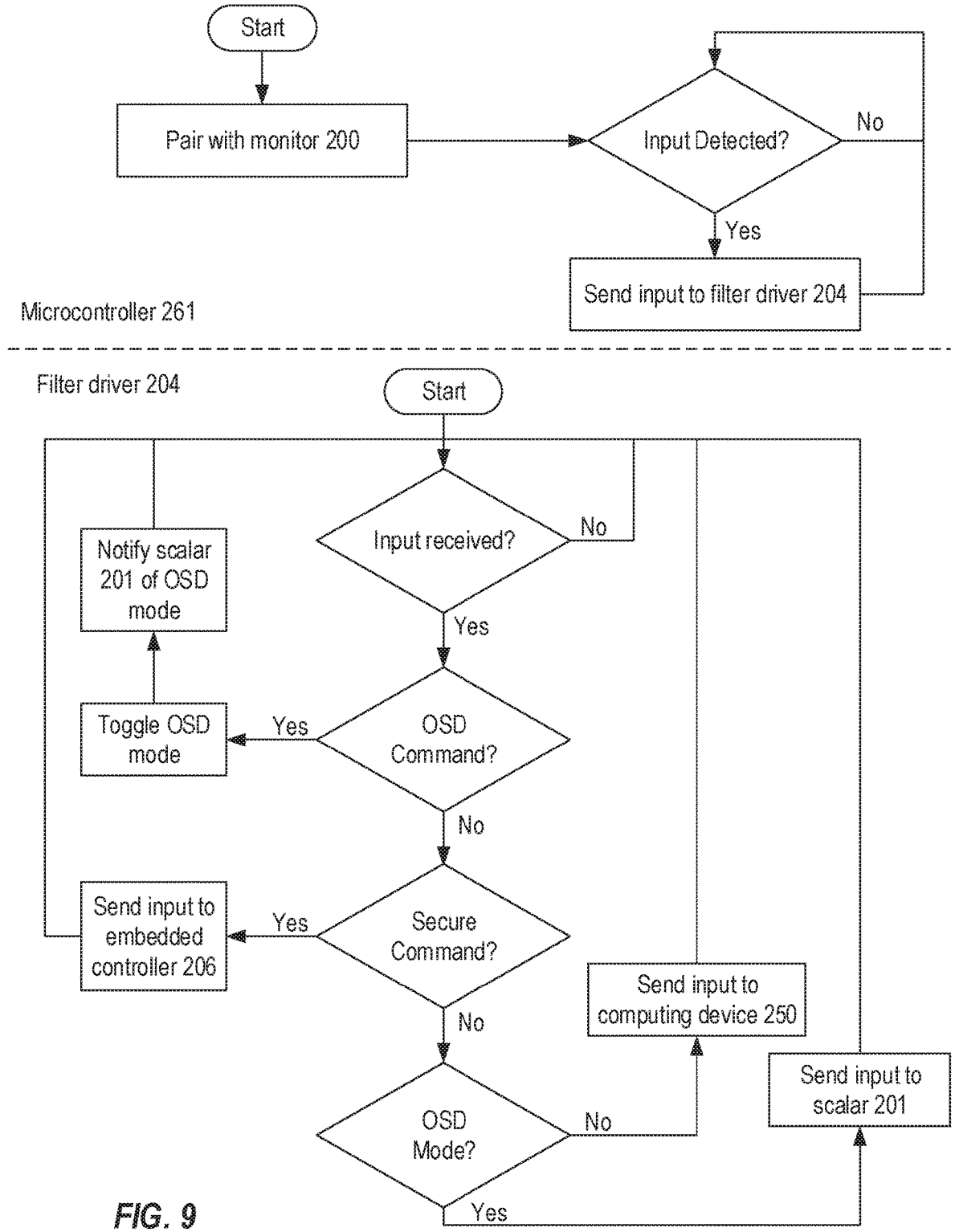
FIG. 9 is a flow diagram of a method that can be implemented in the system shown in FIG. 8 to selectively control a monitor's OSD with a keyboard or mouse.

As represented in the top portion of FIG. 9, in system 890, microcontroller 261 can perform the same functionality as microcontroller 261 performs in system 490. However, filter driver 204 can perform the additional determination of whether the input is a secure command. As described above, when the input is a secure command, filter driver 204 can route the input to embedded controller 206.

In conclusion, embodiments of the present invention encompass a variety of techniques that can be employed in a variety of system configurations to enable the user to selectively control an OSD using the same keyboard, mouse or other human interface device that the user employs to provide input to the computing device. Such techniques eliminate the difficulties that would otherwise exist when the OSD can only be controlled using physical buttons on the monitor.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media are categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similar storage medium which can be used to store desired program code means in the form of computer-executable instructions or data structures and which can be accessed by a general purpose or special purpose computer. Transmission media include signals and carrier waves. Because computer storage media and transmission media are disjoint categories, computer storage media does not include signals or carrier waves.

Computer-executable instructions comprise, for example, instructions and data which, when executed by a processor, cause a general-purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, smart watches, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A system comprising:
    a computing device;
    a monitor; and
    a human interface device;
    wherein the system is configured to perform a method for selectively controlling the monitor's on-screen display (OSD) with the human interface device, the method comprising:
       prior to detecting an OSD command, providing input from the human interface device to the computing device;
       while the input from the human interface device is being provided to the computing device, detecting the OSD command; and
       in response to detecting the OSD command, ceasing to provide the input from the human interface device to the computing device and commencing providing the input from the human interface device to the monitor to thereby cause the input to control the monitor's OSD.

2. The system of claim 1, wherein a microcontroller of the human interface device is configured to perform the method.

3. The system of claim 1, wherein a filter driver on the monitor is configured to perform the method.

4. The system of claim 1, wherein the monitor includes a filter driver that is configured to evaluate the input from the human interface device that is provided to the monitor to determine whether the input includes any secure commands, wherein the filter driver routes any input that is a secure command to an embedded controller of the monitor and routes any input that is not a secure command to a scalar of the monitor.

5. The system of claim 1, wherein detecting the OSD command comprises detecting the OSD command in the input from the human interface device.

6. The system of claim 1, wherein the method further comprises:
    again detecting the OSD command; and
    in response to again detecting the OSD command, ceasing to provide the input from the human interface device to the monitor and commencing providing the input from the human interface device to the computing device.

7. A method for selectively controlling a monitor's on-screen display (OSD) with a human interface device, the method comprising:
    prior to detecting an OSD command, providing input from the human interface device to a computing device to which the monitor is connected;
    while the input from the human interface device is being provided to the computing device, detecting the OSD command; and
    in response to detecting the OSD command, ceasing to provide the input from the human interface device to the computing device and commencing providing the input from the human interface device to the monitor to thereby cause the input to control the monitor's OSD.

8. The method of claim 7, wherein detecting the OSD command comprises detecting the OSD command in the input from the human interface device.

9. The method of claim 7, further comprising:
    again detecting the OSD command; and
    in response to again detecting the OSD command, ceasing to provide the input from the human interface device to the monitor and commencing providing the input from the human interface device to the computing device.

10. The method of claim 7, wherein a microcontroller of the human interface device provides the input from the human interface device to the computing device and to the monitor.

11. The method of claim 7, wherein a filter driver on the monitor provides the input from the human interface device to the computing device and to the monitor.

12. The method of claim 7, wherein providing the input from the human interface device to the monitor comprises providing the input from the human interface device to a scalar of the monitor.

13. The method of claim 7, wherein the human interface device is a keyboard or a mouse.

14. The method of claim 7, further comprising:
    evaluating the input from the human interface device that is provided to the monitor to determine whether the input includes any secure commands;
    for any input that is a secure command, routing the input to an embedded controller of the monitor; and
    for any input that is not a secure command, routing the input to a scalar of the monitor.

15. A method for selectively controlling a monitor's on-screen display (OSD) with a human interface device of a computing device, the method comprising:

evaluating input from the human interface device to detect occurrences of an OSD command;

in response to an occurrence of the OSD command, toggling an OSD mode;

for input that is not the OSD command, sending the input to the computing device when the OSD mode is off and sending the input to the monitor when the OSD mode is on.

16. The method of claim 15, wherein the method is performed by a microcontroller of the human interface device.

17. The method of claim 15, further comprising:

evaluating the input that is sent to the monitor; and when a secure command is detected in the input that is sent to the monitor, routing the secure command to the computing device.

18. The method of claim 17, wherein a microcontroller of the human interface device sends the input to the computing device and to the monitor, and wherein a filter driver on the monitor evaluates the input that is sent to the monitor and routes the secure commands to the computing device.

19. The method of claim 15, wherein evaluating input from the human interface device comprises determining which keys of a keyboard or which buttons of a mouse have been pressed.

20. The method of claim 15, further comprising:

in response to the occurrence of the OSD command, notifying a scalar of the monitor of the occurrence of the OSD command to thereby cause the scalar to show or hide the OSD.

* * * * *